United States Patent
Vikberg et al.

(10) Patent No.: US 8,265,685 B2
(45) Date of Patent: Sep. 11, 2012

(54) METHOD AND USER EQUIPMENT IN A COMMUNICATION NETWORK

(75) Inventors: Jari Vikberg, Jarna (SE); Kimmo Hiltunen, Esbo (FI); Tomas Nylander, Varmdo (SE); Hakan Olofsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 121 days.

(21) Appl. No.: 12/866,547

(22) PCT Filed: May 20, 2008

(86) PCT No.: PCT/SE2008/050586
§ 371 (c)(1),
(2), (4) Date: Aug. 6, 2010

(87) PCT Pub. No.: WO2009/099362
PCT Pub. Date: Aug. 13, 2009

(65) Prior Publication Data
US 2010/0323663 A1    Dec. 23, 2010

Related U.S. Application Data

(60) Provisional application No. 61/027,089, filed on Feb. 8, 2008.

(51) Int. Cl.
*H04W 36/00* (2009.01)
(52) U.S. Cl. .................. 455/525; 455/410; 455/411
(58) Field of Classification Search .................. 455/403, 455/404.1, 404.2, 414.1, 432.3, 434, 432.1, 455/438, 439, 440, 442, 452.1, 453, 410, 455/411; 370/238, 329, 331
See application file for complete search history.

(56) References Cited

U.S. PATENT DOCUMENTS

| | | | | |
|---|---|---|---|---|
| 5,926,762 A * | 7/1999 | Arpee et al. | .................. | 455/447 |
| 6,002,934 A * | 12/1999 | Boyer et al. | .................. | 455/447 |
| 6,192,244 B1 * | 2/2001 | Abbadessa | .................... | 455/436 |
| 6,826,414 B1 * | 11/2004 | Reynolds et al. | ............. | 455/555 |
| 7,433,698 B2 * | 10/2008 | Marjelund et al. | ............ | 455/462 |
| 7,634,272 B2 * | 12/2009 | Yamashita et al. | ............ | 455/444 |

(Continued)

FOREIGN PATENT DOCUMENTS

EP    1286561 A1    2/2003

(Continued)

OTHER PUBLICATIONS

3rd Generation Partnership Project. "Alternatives for E-UTRAN Neighbour Cell Information." 3GPP TSG GERAN#37bis, Tdoc G2-080134, Agenda Item 5.3.3, Sophia-Antipolis, France, Mar. 31-Apr. 2, 2008.

(Continued)

*Primary Examiner* — Jean Gelin
(74) *Attorney, Agent, or Firm* — Coats & Bennett, P.L.L.C.

(57) ABSTRACT

The invention relates to a user equipment (600) comprising a receiving unit (606) arranged to receive, when the user equipment (600) is in idle mode, data from a base station indicating an identification of a second cell of a second frequency, a control unit (610) arranged to determine, based on the received data, that the user equipment (600) is not allowed access to the second cell, and, upon determination that the user equipment is not allowed access to the second cell, to perform a cell selection process to change from a present camped first cell of a first frequency to a third cell of a third frequency being different than the first frequency.

17 Claims, 6 Drawing Sheets

U.S. PATENT DOCUMENTS

| | | | |
|---|---|---|---|
| 7,639,641 B2 * | 12/2009 | Laitinen et al. | 370/328 |
| 7,747,275 B2 * | 6/2010 | Funnell et al. | 455/525 |
| 7,917,140 B2 * | 3/2011 | Palenius | 455/434 |
| 8,072,953 B2 * | 12/2011 | Mukherjee et al. | 370/338 |
| 2002/0111180 A1 * | 8/2002 | Hogan et al. | 455/518 |
| 2002/0123348 A1 * | 9/2002 | Willars et al. | 455/436 |
| 2002/0197992 A1 * | 12/2002 | Nizri et al. | 455/435 |
| 2003/0003928 A1 * | 1/2003 | Marjelund et al. | 455/464 |
| 2004/0058684 A1 * | 3/2004 | Charles | 455/450 |
| 2005/0021804 A1 * | 1/2005 | Hameleers et al. | 709/231 |
| 2005/0037798 A1 * | 2/2005 | Yamashita et al. | 455/525 |
| 2005/0090278 A1 * | 4/2005 | Jeong et al. | 455/525 |
| 2005/0153743 A1 * | 7/2005 | Berra et al. | 455/560 |
| 2005/0250529 A1 * | 11/2005 | Funnell et al. | 455/525 |
| 2006/0035662 A1 * | 2/2006 | Jeong et al. | 455/525 |
| 2006/0040700 A1 * | 2/2006 | Roberts et al. | 455/525 |
| 2007/0184834 A1 * | 8/2007 | Jeong et al. | 455/434 |
| 2008/0056195 A1 * | 3/2008 | Lee et al. | 370/331 |
| 2009/0197598 A1 * | 8/2009 | Fischer | 455/434 |
| 2010/0178921 A1 * | 7/2010 | Aqvist et al. | 455/436 |

FOREIGN PATENT DOCUMENTS

WO 2006/061671 A1 6/2006

OTHER PUBLICATIONS

3rd Generation Partnership Project. "LS on E-UTRAN Neighbour Cell List Information for GERAN." 3GPP TSG-GERAN WG2 Meeting #37bis, Tdoc G2-080231, Sopiha Antipolis, France, Mar. 31-Apr. 3, 2008.

3rd Generation Partnership Project. "Measurement Reporting for GERAN / E-UTRAN Inter-working." 3GPP TSG GERAN#38, Tdoc GP-080668, Agenda Item 7.2.5.3.2, 7.1.5.2, Malaga, Spain, May 12-16, 2008.

3Rd Generation Partnership Project. "Summary of e-mail discussion Proposal to remove Neighbor Cell Information in E-UTRA." 3GPP TSG-RAN WG2 #57, T-doc R2-070561, St. Louis, Missouri, Feb. 12-16, 2007.

3rd Generation Partnership Project. "Reduction of Size of Neighbouring Cell List." 3GPP TSG RAN WG2 #57, Tdoc R2-070200, Sorrento, Italy, Jan. 15-19, 2007.

* cited by examiner

METHOD AND USER EQUIPMENT IN A COMMUNICATION NETWORK

TECHNICAL FIELD

The invention relates to a method and user equipment in a communications network. In particular, the invention relates to a method in the user equipment being in idle mode camped on a first cell of a first frequency.

BACKGROUND

Work is ongoing in 3GPP, 3$^{rd}$ Generation Partnership Project, and with some operators to specify and investigate the possibility to provide home and/or small area coverage for a limited number of users using a small base station, commonly called a Femto NodeB for WCDMA, Wideband Code Division Multiple Access, or Femto eNodeB (E-UTRAN (Evolved-UMTS Terrestrial Radio Access Network) NodeB) for LTE, Long Term Evolution. Other commonly used names are HNB (Home NodeB) for WCDMA and HeNB (Home eNodeB) for LTE. The femto solutions based on WCDMA technology are called WCDMA Femto solutions and the solutions based on LTE technology are called LTE Femto solutions. Similar solutions can also be deployed for other radio technologies, like GSM. In this application, the name Femto NodeB is used as an exemplary name for the small base station and should not be read to limit the scope only to WCDMA Femto solutions. In the same way, the term Macro NodeB is used as an exemplary name for any traditional base station using any technology. The Femto NodeB would provide normal LTE/WCDMA/GSM coverage for the end users, a so called femto cell, and would be connected to the mobile operator's network using some kind of IP based transmission. One example is to use fixed broadband access (e.g. xDSL or Cable) to connect the Femto node to the mobile operator's network. Another alternative would be to use Mobile Broadband access, for example, High Speed Downlink Packet Access, HSDPA, and Enhanced Uplink.

There are several ways to use the available radio frequencies between the femto layer and the traditional cellular deployment layer, referred to as 'macro' layer even though it may comprise both macro, micro and pico cells. There are three main Channel Deployment Scenarios (CDS) that are relevant, namely:

CDS1: One frequency is used by both the Femto NodeBs and the Macro NodeBs. This CDS has some severe interference problems that will make it hard to work.

CDS2: One dedicated frequency is used only by the Femto NodeBs and (at least) another frequency is used only by the Macro NodeBs. This CDS is the preferred one if only technical arguments are taken into account. However, it is very unlikely that operators are willing to dedicate whole frequencies for the femto layer, mostly due to economical reasons.

CDS3: One frequency used both by the Femto NodeBs and the Macro NodeBs and (at least) another frequency used only by the Macro NodeBs.

CDS3 is expected to be a common way for deployments. This deployment scenario may as well as CDS1 cause different types of interference in certain scenarios, both between the femto and the macro layer and internally in the femto layer as it is assumed that all the Femto NodeBs are using the same frequency.

By using frequency deployment scenario CDS3, as well as by using CDS1, it is possible that different types of interference is created when a user equipment (UE) camped on the macro network in the first cell on the first frequency approaches a second cell, a femto cell on a second frequency and the first and second frequencies are the same. The following scenario describes the different types of interference that may arise in this case and applies mostly for WCDMA Femto, but may also apply for LTE Femto as well as for GSM Femto solutions.

An UE active or camped on a femto cell is called Femto UE in this application. In a similar way, an UE active or camped on a macro cell is called Macro UE. In a scenario, the Macro UE is camped on the macro network on a first macro cell on the same frequency as the second femto cell, that is, the first and second frequencies are the same. The Macro UE enters the area of femto cell coverage and if the Macro UE is not allowed to use the femto cell for any reason, for example, based on Access Control as part of idle mode behavior, it may continue to camp on the first macro cell that is on the same frequency as the second femto cell. If the Macro UE later enters active or connected mode, it will create interference towards the femto cell and the Femto UEs using that cell. Depending on the location of the Macro UE, this may lead to very poor performance of the interfered Femto NodeB.

In a similar way, the femto cell, that is, the Femto NodeB and the Femto UEs on that Femto NodeB, may create interference towards the Macro UE. For example, if a Femto UE is currently in idle mode and would later enter active mode, then interference would be created towards the Macro UE.

SUMMARY

A method is provided in a user equipment being in an idle mode camped on a first cell of a first frequency. The method comprises the steps of: receiving from a second cell data indicating an identification of the second cell of a second frequency being the same frequency as the first frequency, determining that the user equipment is not allowed to access the second cell, and performing, upon determination that the user equipment is not allowed to access the second cell, a cell selection process to attempt to find a third cell to access, of a third frequency, being different than the first frequency, in order to avoid interference between the user equipment and the second cell.

In order to perform the method a user equipment is provided comprising a receiving unit arranged to receive, when the user equipment is in idle mode, data from a base station indicating an identification of a second cell of a second frequency. The user equipment further comprises a control unit arranged to determine, based on the received data, that the user equipment is not allowed access to the second cell. Upon determination that the user equipment is not allowed access to the second cell, the control unit is arranged to perform a cell selection process to change from a present camped first cell of a first frequency to a third cell of a third frequency being different than the first frequency.

Embodiments reduce interference by letting the UE perform proactive cell selection in idle mode from a first cell on first frequency to a third cell on a third frequency.

In some embodiments, this is performed as soon as it is detected that a forbidden second cell on a second frequency and the first and the second frequencies are the same, is close by, which could be interfered once the UE would establish a session or that could create interference towards the UE.

BRIEF DESCRIPTION OF THE DRAWINGS

Embodiments will now be described in more detail in relation to the enclosed drawings, in which.

DETAILED DESCRIPTION OF PREFERRED EMBODIMENTS

Figure 1:
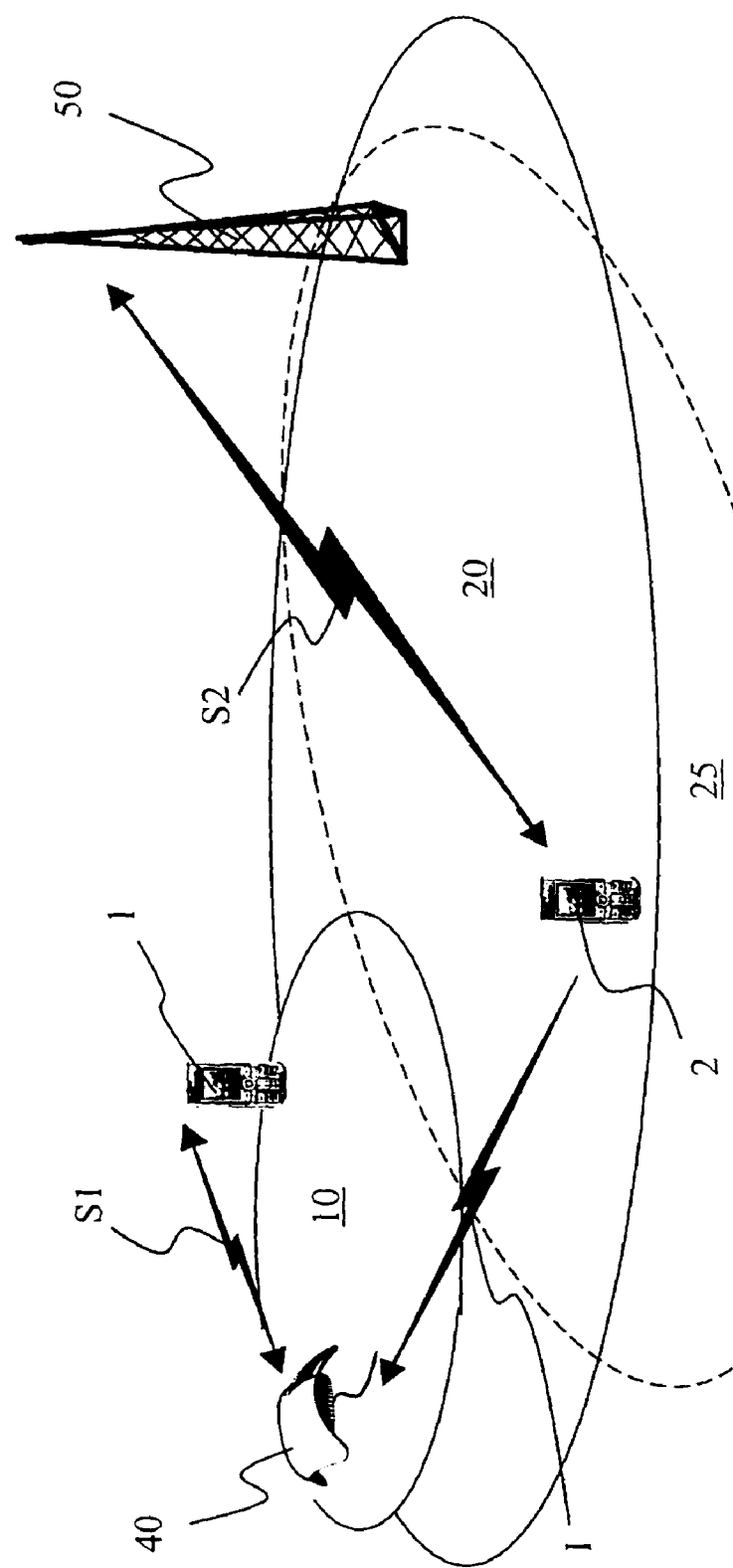
FIG. 1 shows a schematic overview of a communications network.

The present invention will now be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

Well-known functions or constructions may not be described in detail for brevity and/or clarity.

The present invention may be embodied as methods, electronic devices, and/or computer program products. Accordingly, the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system.

In the context of this document, a computer-usable or computer-readable medium may be any medium that can contain, store, communicate, propagate, or transport the program for use by or in connection with the instruction execution system, apparatus, or device.

Embodiments according to the present invention are described with reference to block diagrams and/or operational illustrations of methods and communication terminals. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be any tangible electronic, magnetic, optical, electromagnetic, infrared, or semiconductor system, or any other tangible apparatus or device. More specific examples (a nonexhaustive list) of the computer-readable medium include the following: hard disks, optical storage devices, magnetic storage devices, a portable computer diskette, a random access memory (RAM), a read-only memory (ROM), an erasable programmable read-only memory (EPROM or Flash memory), and a compact disc read-only memory (CD-ROM).

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. It will be further appreciated that the functionality of any or all of the program modules may also be implemented using discrete hardware components, one or more application specific integrated circuits (ASICs), or a programmed digital signal processor or microcontroller.

As used herein, "electronic component" means an active device as contrasted with a passive electrical connector or the like. An electronic component may include a processor.

As used herein, a "user equipment" includes, but is not limited to, a terminal that is configured to receive/transmit communication signals via a wireline connection, such as via a public-switched telephone network (PSTN), digital subscriber line (DSL), digital cable, or another data connection/network, and/or via a wireless interface with, for example, a cellular network, a satellite network, a wireless local area network (WLAN), and/or another use equipment.

When the user equipment is configured to communicate over a wireless interface, may be a "wireless communication terminal" or a "wireless terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

As used herein, "mobile terminals" may be portable, transportable, installed in a vehicle (aeronautical, maritime, or land-based), or situated and/or configured to operate locally and/or in a distributed fashion at any other location(s) on earth and/or in space.

In the following text 'RNC', Radio Network Controller, should be read as a logical entity that either is a standalone entity or combined with a Femto NodeB. The term "Femto RNC" is used in this application to describe an RNC where Femto NodeBs are connected to. The same term is also used to describe any other central node (for example, a "Femto Operation and maintenance node") that is part of the automatic installation procedure or that is part of the Access control procedure described in this application. It is also used in the case when the RNC is combined with a Femto NodeB. Furthermore, the "Femto RNC" entity could also be a part of an RNC controlling also Macro NodeBs.

In FIG. 1, a schematic overview of a communications network is shown. The network comprises a first base station 50 comprising a first cell 20 of a first frequency and a second base station 40 comprising a second cell 10 of a second frequency being the same as the first frequency. Furthermore, the first base station 50 comprises a third cell 25 of a third frequency being different than the first frequency. The third cell 25 of a third frequency could also be served by a third base station (this scenario is not shown in FIG. 1).

A first user equipment 1 is active in a session S1 within the second cell 10 with the second base station 40. The second frequency is allocated to the second cell 10. A second user equipment 2 is camped on in idle mode within the first cell 20 of the first frequency allocated to the first base station 50. As the second user equipment 2 moves closer to the second cell 10, radio signals from the second cell 10 is received and the second cell is detected by the second user equipment 2. The second cell 10 is a cell with access control and the second user equipment 2 is forbidden to access the second cell 10.

It should here be noted that if the second user equipment would go active on the first frequency the active session S1 of the first user equipment 1 will be exposed for interference I from the second user equipment 2. In order to avoid this, the second user equipment 2 will, as a cell of the present frequency, but to which the second user equipment 2 is not allowed to access, is detected, attempt to find a different cell of a different frequency by performing a cell selection.

Another similar scenario is the case when the first user equipment 1 would initially be camped on in idle state on the second cell 10 with the second base station 40, and would later enter active state. Once this happens and the second user equipment 2 in the first cell 20 of the first frequency allocated to the first base station 50 is close enough to the second cell 10, the second user equipment 2 would be exposed for interference from the second cell 10 and first user equipment 1.

The determination is performed in a user equipment such as a wireless communication device, for example, a PDA, mobile phone or the like.

The cell selection may be performed in a process wherein cells of the present first frequency are down prioritized.

The scenario applies mostly for WCDMA Femto, but may also apply for LTE Femto. For GSM Femto solutions the interference problem could most likely be avoided by good carrier allocation policy. However if, for example, dedicated frequencies cannot be allocated for the GSM femto layer, the scenario may apply also in the GSM case.

The WCDMA Femto solution and related concepts are used in the specification as an example to describe some of the main differences between femto and traditional macro solutions. Similar differences exist also between the other femto solutions and traditional macro network deployments. It is assumed that a small number of Primary Scrambling Codes (PSC) is allocated to the femto layer. This could be, for example, ten codes. These PSCs are configured in a cell neighbor lists on the macro layer, that is, in the macro cells, and signaled as part of the system information to user equipments UEs camped on these macro cells for their idle mode cell reselection.

Cell reselection is a process in the radio resource layers in the UE in which the UE selects the best of possible cells to camp on. This procedure is normally performed in idle mode but applies also to some other modes. It is preceded by a Public Land Mobile Network, PLMN, selection procedure in the upper layers in the UE, meaning that the radio resource layers only search for cells belonging to the selected PLMN. The cell reselection process is based on the above neighbor cell information received from the network and measurements performed by the UE on these neighbor cells. The main assumption is that the above system information is configured so that the UEs will prioritize the femto cells in the cell reselection process, that is, the PSCs allocated for the femto layer are preferred for all UEs. Cell selection is another process in the UE that is normally performed at initial power-on of the UE and without guidance from the network. In this application, the term "cell selection" is used to apply both for cell selection as well as cell reselection and/or the like.

There are two different principles in how an UE will find out that a femto cell is not an allowed one. These are based on so called whitelist and blacklist approaches.

The blacklist approach consists of two different methods. The main principle is that the blacklist contains information about forbidden femto cells. In the first method the blacklist does not contain any information about a detected femto cell so the UE attempts to access the femto cell and access reject signaling is indicated to the UE from the femto cell i.e. the network signals to the UE that the femto cell is not an allowed one. In this case the UE also updates the blacklist information. The second method is based on that the UE has before attempted to access a femto cell and the blacklist holds information about this. In this case, it is enough for the UE to read some broadcasted system information from the femto cell to find out, based on the blacklist contents, that the femto cell is not an allowed one.

The whitelist approach consists only about one method. The whitelist contains information about allowed femto cells. This means that the UE does not need to attempt to access a detected femto cell to find out whether the femto cell is allowed one or not. Instead, the UE just reads the broadcasted system information identifying the femto cell and if the CSG, Closed Subscriber Group, or cell identity is included in the whitelist, the UE assumes that the femto cell is an allowed one and may attempt to access the femto cell. Also in this case the network may return access reject signaling that would result in the UE removing the current femto cell from the whitelist.

There are some principal differences in the working assumptions for Access control for the different technologies as following.

In the GSM Femto and WCDMA Femto solutions the described blacklist approach may be used. It is assumed that a number of Location Area Identities are allocated for the femto layer. When an UE attempts to access a femto cell, it will read the broadcasted system information and find out that the Location Area (LA) is different to the previous LA in the macro network. A location update request is triggered and the network checks whether the UE is allowed to access the femto cell. In the case the access attempt is denied, the network sends a location update reject to the UE and indicates one of the different cause codes that in principle mean "LA not allowed". Once the UE receives this message and cause code, it is supposed to add the LAI in the "Forbidden LAIs" list and not attempt to access any cells belonging to LAs in that list.

In the LTE Femto solutions the described whitelist approach may be used. The $1^{st}$ LTE standard will support LTE Femto solutions and better Access Control mechanisms are possible (compared to the "Forbidden LA" blacklist solution described above). The current working assumption is that the UE will hold a "CSG White List". The list will contain for example the CSG or cell identities of every femto cell where the UE is allowed access. Each femto cell will also broadcast in the system information a "CSG cell" indicator so that the UE can use in the logic to know when to apply the "CSG White List". If this indication exists and the current cell identity is not part of the "CSG White List", then the LTE femto cell is (most likely) a forbidden one. It would also be possible to introduce this "CSG White list" for other solutions like WCDMA Femto solutions. This would however mean changes to the existing UE specifications and that new UEs would need to be introduced.

Figure 2:
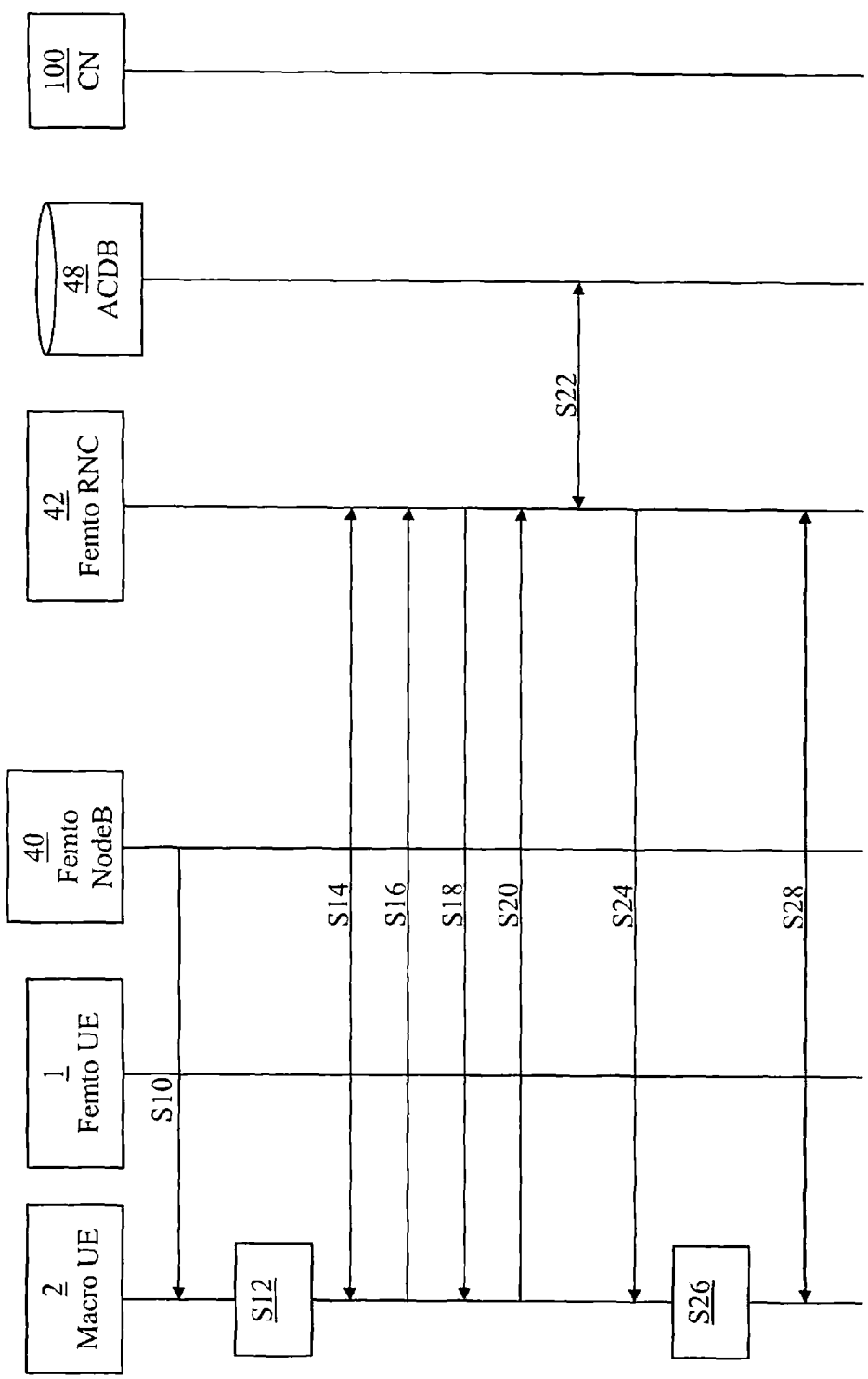
FIG. 2 shows a schematic signalling scheme in a communications network describing the first method of the blacklist approach in GSM/WCDMA Femto solutions.

In FIG. 2 a schematic signaling diagram is shown of a communication system. The schematic signaling diagram describes the first method of the blacklist approach in GSM/WCDMA Femto solutions. The diagram comprises a number of steps. FIG. 2 shows the case when a Macro UE approaches the coverage area of a forbidden femto cell for the very first time. This means that the Macro UE does not know whether it is allowed to access the femto cell or not as the femto cell is not included in the blacklist. The Macro UE attempts to camp on the femto cell and the network indicates to the Macro UE that it is not allowed to access the femto cell and the UE updates the blacklist.

In step S10, a Macro UE 2 is initially camped on a first cell, a macro cell, when the UE 2 detects a second cell, being a femto cell, and reads the relevant femto cell system information. Both the first and the second cells are using the same frequency. Then, the UE 2 attempts to camp on the femto cell.

In step S12, the received system information is passed to a Non-Access Stratum (NAS) layers (i.e. Mobility Management, MM) which detects that the Location Area Identity (LAI) of the femto cell is different than the previous LAI on which NAS registration was performed. NAS triggers the Location Updating procedure towards the network via lower layers, for example, Radio Resource Control (RRC) layer or the like.

In step S14, the RRC layer in the UE 2 triggers RRC connection establishment by sending the RRC CONNECTION REQUEST message to a Femto RNC 42. The RRC CONNECTION REQUEST message contains the Establishment Cause IE with the value "Registration" (indicating Location Updating procedure). The RRC connection may be established using existing principles such as defined in 3GPP TS 25.331 or the like.

In step S16, once the RRC connection is successfully established between the UE 2 and the Femto RNC 42, the UE 2 sends the LOCATION UPDATING REQUEST message to the Femto RNC 42. This message contains mobile identity, such as TMSI, Temporary Mobile Subscriber Identity, or the like, and other information (e.g. Location Updating type, Classmark and/or the like).

Normally, the TMSI is used as the mobile identity, but in some cases it is also possible that the IMSI, International Mobile Subscriber Identity, is used as the mobile identity. The Location updating type indicates normally "Normal location updating" when the UE 2 moves between Location Areas.

The femto RNC 42 knows the identity of the Femto NodeB used (a so called FemtoRBS-ID) for the RRC connection establishment and stores this information. Femto RNC also stores the received LOCATION UPDATING REQUEST message.

If TMSI was used as the mobile identity in the LOCATION UPDATING REQUEST message, the Femto RNC 42 continues in step S18.

However, if IMSI was used as the mobile identity, then the Femto RNC 42 skips the steps S18 and S20 and triggers an Access Control in step S22.

In step S18, the Femto RNC 42 triggers an identification procedure towards the UE 2 by sending the IDENTITY REQUEST message to the UE 2. The identity type requested indicates IMSI. The messages and information elements may be as defined in 3GPP TS 24.008 with the main exception that the Identity request procedure is performed from the RAN/RNC towards the UE to retrieve the IMSI.

In step S20, the UE 2 responds to the identification procedure by sending the IDENTITY RESPONSE message to the Femto RNC 42. This message contains the IMSI of the UE 2.

In step S22, the Femto RNC 42 is enabled to perform the Access Control as it holds both the IMSI of the UE 2 and the FemtoRBS-ID of the used Femto NodeB 40. Femto RNC 42 triggers Access Control towards an ACDB (Access Control Database) 48. The FemtoRBS-ID stored in step S14 and the IMSI received in step S20 (or already in step S16) are used for the Access Control function. Then, the ACDB 48 returns an indication whether access is to be denied or allowed.

In step S24, it is disclosed that if access is to be denied and the Femto RNC 42 rejects the Location updating procedure a LOCATION UPDATING REJECT message is sent to the UE 2. The Femto RNC 42 may also indicate a reject cause (for example, either "Location Area not allowed" or "No Suitable Cells In Location Area") so that the UE 2 does not reattempt the Location updating procedure from this LA.

In step S26, the Macro UE 2 updates a "Forbidden LAs" list depending on the reject cause, for example:

In case "Location Area not allowed", the UE 2 stores the LAI in the list of "forbidden location areas for regional provision of service" and perform a cell selection when back to the idle state, In case "Roaming not allowed in this location area", the UE 2 stores the LAI in the list of "forbidden location areas for roaming" and perform a PLMN, public land mobile network, selection instead of a cell selection when back to the MM IDLE state, In case "No Suitable Cells In Location Area", the UE 2 stores the LAI in the list of "forbidden location areas for roaming" and search for a suitable cell in another location area in the same PLMN.

In step S28, the Femto RNC 42 initiates RRC connection release procedure by sending the RRC CONNECTION RELEASE message to the UE 2. Femto RNC 42 includes the Redirection information IE in the message and it can be used to redirect the UE 2 to another WCDMA macro layer frequency or for example to GSM.

It should here be noted that in deciding whether to redirect the UE 2 to another frequency or RAT, radio access technology, the RNC 42 may include an algorithm considering the risk that the UE 2 will interfere with the denied Femto cell once the UE 2 establishes a session.

In WCDMA or GSM a Forbidden Location Area list may be built in accordance with FIG. 2. The radio resource level signaling is different between WCDMA and GSM, but the Location Updating related signaling and so the updating of the Forbidden Location Areas information is same.

Figure 3:
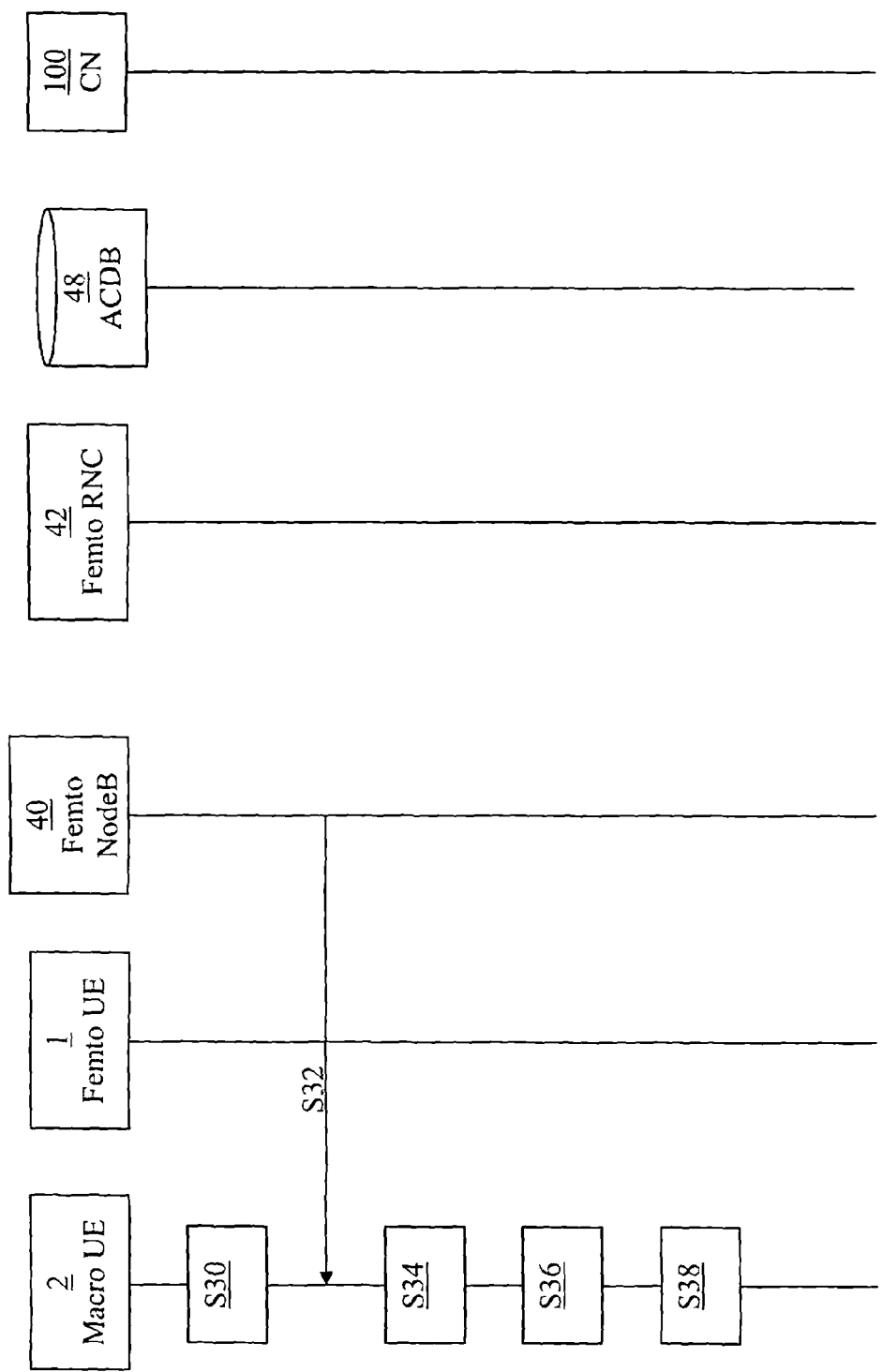
FIG. 3 shows a schematic signalling scheme in a communications network describing both the second method of the blacklist approach in WCDMA Femto solutions and the whitelist approach in LTE Femto solutions.

In FIG. 3, a schematic overview of a signaling scheme of a user equipment being in idle mode is disclosed. The scheme describes both the second method of the blacklist approach in WCDMA Femto solutions and the whitelist approach in LTE Femto solutions. FIG. 3 shows the case when the Macro UE approaches the coverage area of a femto cell that is already included in the blacklist or is not included in the whitelist. This means that the Macro UE knows whether it is allowed to access the femto cell once it has read some parts of the system information broadcasted in the femto cell. In the illustrated example, the Macro UE 2 is approaching the coverage area of a forbidden femto cell. The current macro cell and the forbidden femto cell use the same frequency. In WCDMA, a "Forbidden LAs" list in the Macro UE 2 also contains the LA of the forbidden femto cell and in LTE, the "CSG White List" in the Macro UE contains allowed LTE femto cells, not the forbidden femto cell the Macro UE is approaching.

In step S30, a "Forbidden LAs" list in the Macro UE 2 contains a location area, LA, of the forbidden femto cell, or in LTE, a "CSG White List" in the Macro UE 2 contains the allowed LTE femto cells and does not contain the forbidden femto cell.

In step S32, the Macro UE 2 is initially camped on a macro cell when it detects the femto cell and reads the relevant femto cell system information, for example, the LAI, CSG indicator, CSG and/or cell identity and/or the like, from the Femto NodeB 40. Both the macro and the femto cell are using the same frequency.

In step S34, the Macro UE 2 detects that the LAI of the femto cell is on the "Forbidden LAs" list and that the femto cell is thus an forbidden femto cell in an WCDMA example, or in the case of an LTE example, the UE 2 detects that the femto cell is not included in the "CSG White List" and that the femto cell is thus a forbidden femto cell.

In step S36, the Macro UE 2 has a standardized behaviour to attempt to find another frequency or RAT, Radio Access Technology, using a different frequency to find suitable cells. This means that the User Equipment cell selection and cell reselection procedures in idle mode, specified in 3GPP TS 25.304 (WCDMA) and 3GPP TS 36.304 (LTE), may be enhanced to take into account that the Macro UE 2 is too close to a forbidden femto cell on the same frequency as the current serving macro cell.

This behaviour may be controlled by threshold values related to, for example, signal strength measurements from the forbidden femto cell or the like. The threshold value can either be configured locally in the UE 2 or returned from the network to the UE 2. This last part could be achieved by signalling the needed information as part of system information either from the macro cells or from the femto cells, including the forbidden femto cells.

It should be noted that the Macro UE 2 may continue searching for allowed femto cells also in the second frequency where the forbidden femto cell was initially detected after it has performed cell selection to a third cell on a third frequency. This is needed as it is assumed that all the femto cells are deployed on the same frequency and that the Macro UE may also approach an allowed femto cell later on.

In some embodiments a "penalty value" may be used for all the macro cells on the same frequency as the forbidden femto cell. The "penalty value" could be used so that the signal strength or quality measurement value is decreased by this value and the cells are prioritized first after this step. This would mean that the UE 2 would not necessarily select another frequency unless the macro cells on that frequency would provide sufficient service for the UE 2 and the cells of the same frequency would, however, be down prioritized. The "penalty value" may also be either configured locally in the UE or indicated from the network to the UE in the same way as described above for the threshold value.

In step S38, the Macro UE 2 has performed cell selection away from the first frequency and is camping on a suitable cell on a third frequency or another RAT. A "suitable cell" is a cell on which the UE may camp on to obtain normal service. If the UE is unable to find any suitable cell of a selected public land mobile network, PLMN, the UE may enter an "Any cell selection" state where cells of a different frequency are prioritized.

Hence, the UE is arranged to execute the cell selection evaluation process on the following occasion that the UE in idle mode detects a second cell on the same frequency as the current first cell and that the UE is not allowed to access.

The cell selection may be performed as cell reselection as described in this document and based on neighbouring cell and frequency information received from the network.

The cell selection may be performed as an initial cell selection requiring no prior knowledge of which radio frequency channels are UTRA carriers. The UE may scan all radio frequency channels in the UTRA bands according to its capabilities to find a suitable cell. On each carrier, the UE need only search for the strongest cell. Once a suitable cell is found this cell shall be selected. However, embodiments disclose where signal quality/strength of cells with the same frequency as the first cell are reduced a preset amount in order to prioritize non-interfering cells of different frequencies.

The cell selection may also be performed based on stored information of carrier frequencies and optionally also information on cell parameters, e.g. scrambling codes, from previously received measurement control information elements. Once the UE has found a suitable cell the UE selects it. If no suitable cell is found the Initial cell selection procedure may be started. Also here signal quality/strength of cells with the same frequency as the first cell may be reduced a preset amount in order to prioritize non interfering cells of different frequencies.

In GSM a similar method according to the WCDMA method will be performed.

In GSM IDLE mode the UE 2 reports its location to core network, CN, 100 by sending Location Updates (LU) and Routing Area Updates (RAU). These messages include the old Location Area Identifier (LAI) or old Routing Area Identifier (RAI) depending on the Core Network CN domain. GSM Mobile Switching Centre, MSC/Serving General packet radio service Support Node, SGSN, shall be able to retrieve the old MSC/SGSN based on the received identifiers.

In each MSC/SGSN each LAI/RAI may be mapped uniquely to one and only one signalling address.

Figure 4:
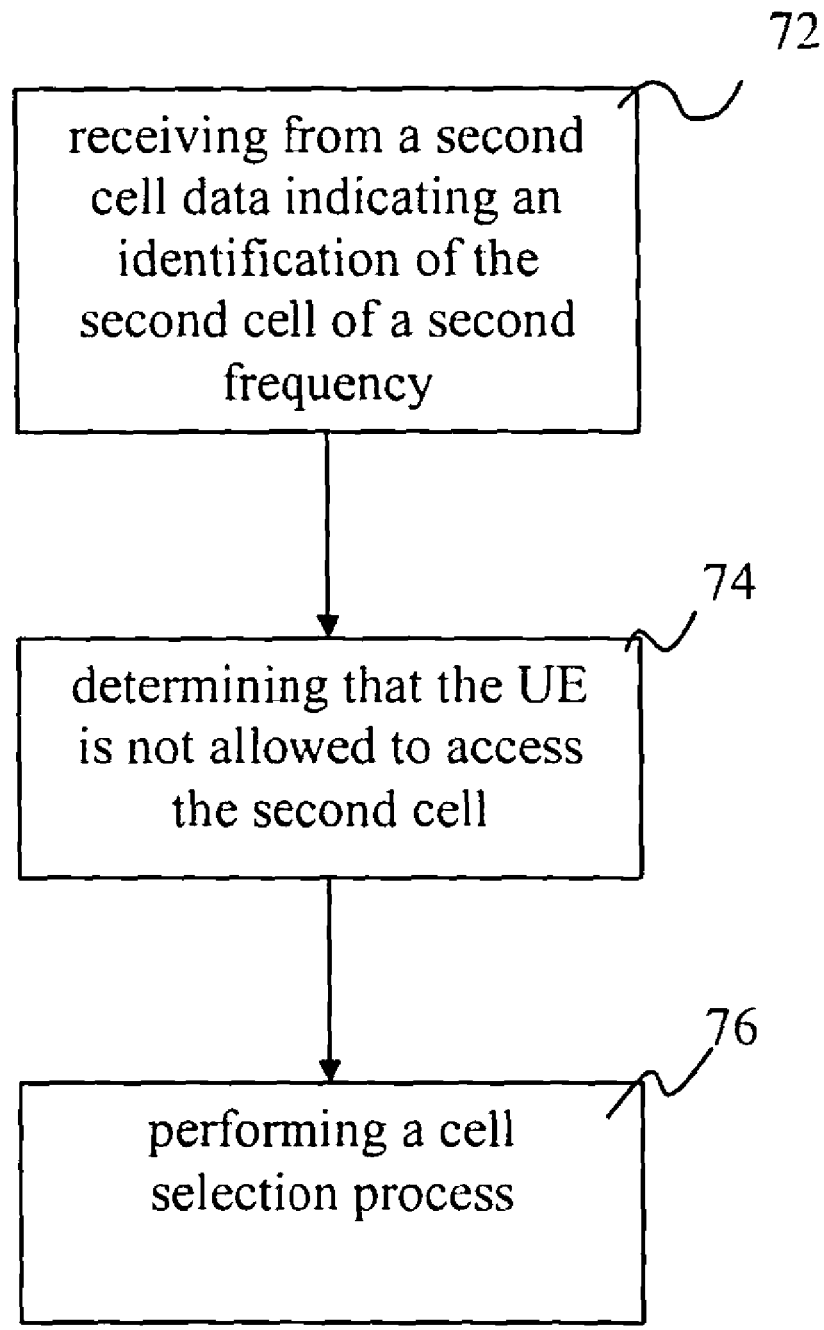
FIG. 4 shows a schematic flow chart of a method in a user equipment.

FIG. 4 shows a schematic flow chart in a user equipment being camped on a first cell of a first frequency in a communications network.

In step 72, the user equipment detects a second cell and receives data from the second cell of a second frequency being the same as the first frequency. The data may comprise a CSG or cell identity, location area identity and/or the like.

In step 74, the user equipment determines based on the received data whether the user equipment is allowed to access the second cell. In embodiments the determination comprises comparing the received CSG or cell identity with a stored list of CSG or cell identities. The list may comprise cell identities where the user equipment is allowed access, cell identities where the user equipment is not allowed access or a combination of the two. Furthermore, the user equipment may check an additional criterion, such as that the signal strength of the signal from the second cell and if the signal strength exceeds a predetermined threshold the second cell is determined to be too close. This threshold may be configured locally on the user equipment or received from a network unit.

In step 76, the user equipment performs a cell selection to find a third cell of a third frequency being different than the first frequency and initiates a cell selection to the third cell. This is performed if it is determined in step 74 that the user equipment is not allowed access and optional if the user equipment is too close the second cell.

The cell selection may be initiated when determining that the data comprises a PSC indicating that the detected cell is a cell with access control.

Figure 5:
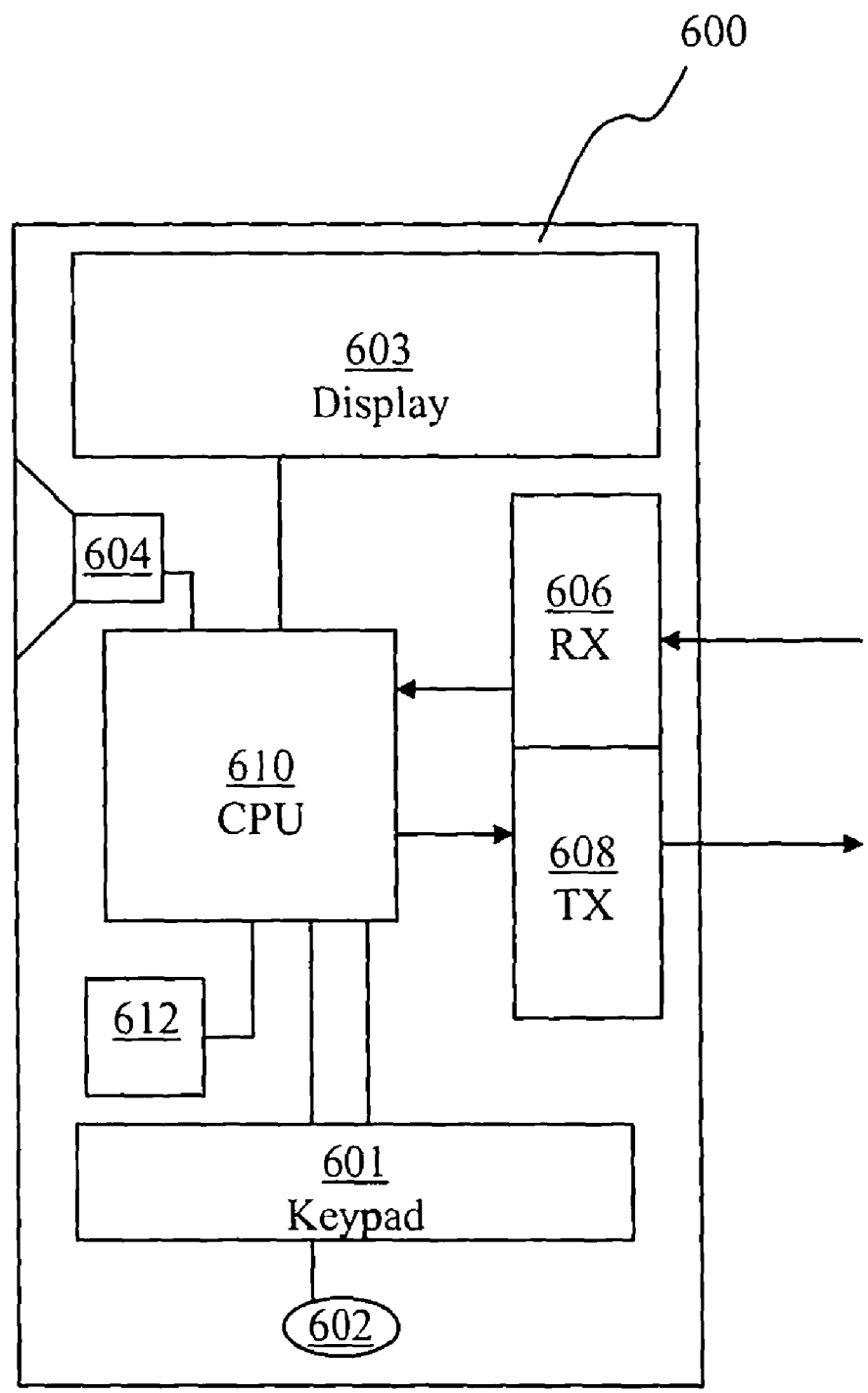
FIG. 5 shows a schematic overview of a user equipment.

FIG. 5 schematically illustrates a user equipment 600 in the form of a mobile phone. The phone 600 comprises a support structure including a chassis and a cover, directly or indirectly supporting the other components of the terminal. Phone 600 is further devised with a user input interface comprising a keypad 601 and preferably also a microphone 602. The user input interface may also comprise a touch-sensitive display in addition to or instead of keypad 601. Furthermore, a user output interface of phone comprises a display 603 and preferably also a speaker 604. The phone 600 may further comprises a signal transceiver, including an antenna and arrangements 606 RX, 608 TX for radio transmission and reception, for communicative connection to a base station of a communications network, such as a WCDMA network. A power supply is preferably included in phone 600 in the form of a battery, and a cable socket for connection to a mains outlet via a transformer. Phone 600 is also devised with a computer system, including a control unit 610 CPU, such as a microprocessor, central processing unit or the like, with associated memory 612 and software, configured to carry out the tasks of signal processing and data handling in the phone.

The control unit 610 is arranged to determine, based on received data from a second cell of a second base station, that the user equipment 600 is allowed access. Upon determination that the user equipment is denied access to the second cell on a second frequency on the second base station, the control unit 610 is arranged to perform a cell selection to change from a present camped first cell of a first frequency to a third cell of a third frequency being different than the first frequency.

The control unit 610 may be arranged to compare the received data from the receiving unit 606 RX with entries in a list stored in the memory 612. The received data may comprise an indication that the cell is a restricted cell, such as a PSC dedicated for cells with restricted access or the like.

The list stored in the memory 612 may be a "CSG White List", containing CSG or cell identities indicating that the user equipment is allowed access. The list stored in the memory 612 may be a forbidden Location Area list containing LAIs, Cell identities and/or the like, of cells that the user equipment is not allowed to access.

The control unit 610 may be arranged to build a "CSG White List" or a forbidden LA list of cells during previous connection requests to different cells or based on other communication with the network.

Furthermore, the control unit 610 may be arranged to reduce a measured value of the signal measurements of cells of a first frequency.

The cell selection may be performed by the user equipment resulting in moving the user equipment to camp on a cell of a different frequency than the present cell but allocated to the same base station. The cell selection may also be performed by the user equipment resulting in moving the user equipment to camp on a cell of a different frequency of a different base station, RNC or the like.

In addition, the cell selection may be performed from a first radio access technology of a first frequency to a second radio access technology of a different frequency.

The UE is arranged to perform a cell selection process, wherein the cell selection process comprises cell selection as well as cell reselection and/or the like.

The UE transmitting arrangement 608 TX may be arranged to transmit data, relating to the cell selection process to connect to a selected cell, to an electronic communication device, such as nodeB, RNC, EnodeB, combined RNC/RBS, BTC, or any device in a communications network involved in a cell selection process.

Figure 6:
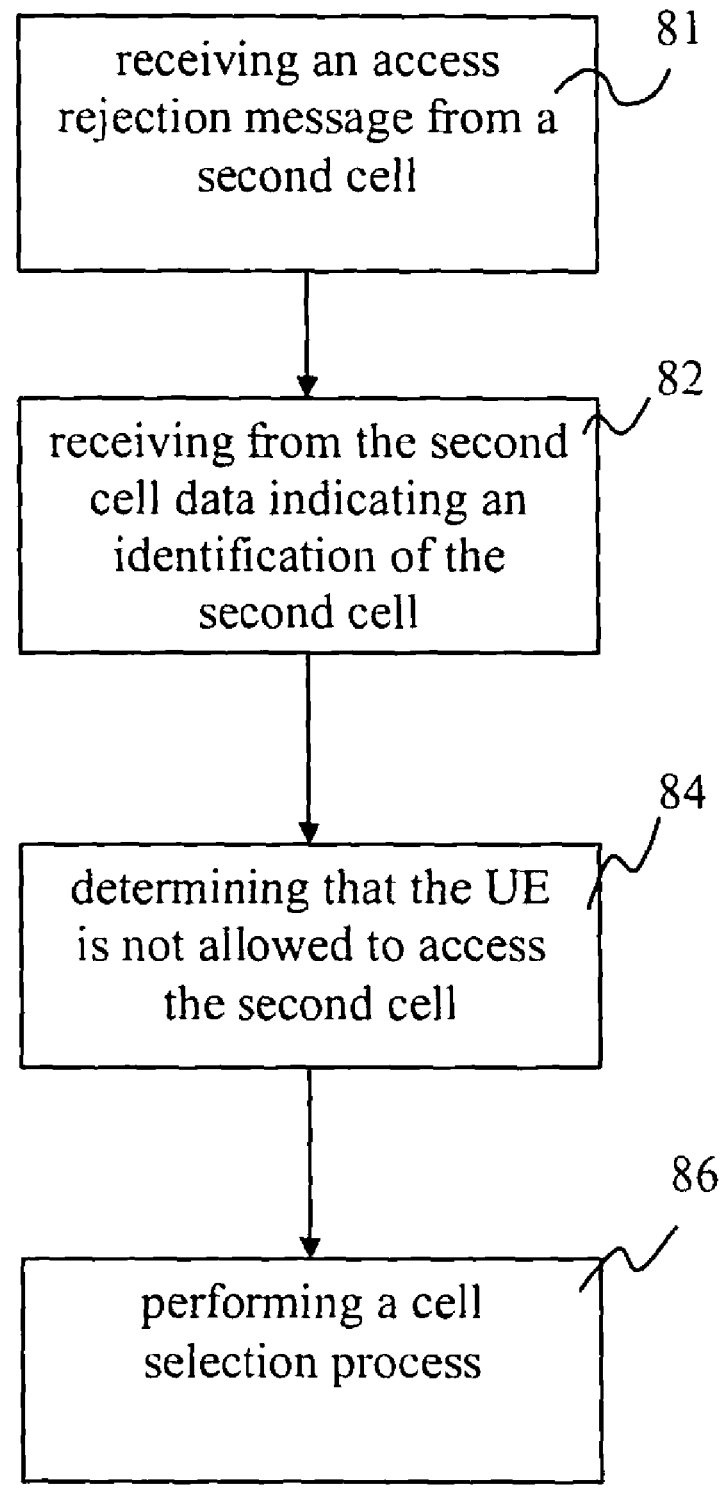
FIG. 6 shows a schematic flow chart of a method in a user equipment.

In FIG. 6, a method in a user equipment camped on a first cell of a first frequency is shown.

In optional step 81, the user equipment receives a rejection message when the user equipment is in active mode indicating that the user equipment is not allowed to access a second cell and updating a list of cells indicating accessibility with the data indicating the identification of the second cell.

In step 82, the user equipment in idle mode receives from the second cell data indicating an identification of the second cell of a second frequency being the same frequency as the first frequency.

In step 84, the user equipment determines that the user equipment is not allowed to access the second cell.

The step of determining that the user equipment is not allowed to access the second cell may further comprise to determine that the data of the second cell is on a list of cells forbidden to access.

In some embodiments, the step of determining that the user equipment is not allowed to access the second cell further comprises to determine that the data of the second cell is omitted from a list of cells permitted to access.

In step 86, the user equipment performs, upon determination that the user equipment is not allowed to access the second cell, a cell selection process to attempt to find a third cell to access, of a third frequency, being different than the first frequency, in order to avoid interference between the user equipment and the second cell.

The step of performing a cell selection process may comprise to take into account that the user equipment is too close to a forbidden cell. The cell selection process may be controlled by a predetermined threshold value of signal measurement of the second cell that needs to be exceeded in order to initiate the cell selection.

The cell selection process may further comprise a step of reducing signal strength and/or quality measurements by a predetermined value of cells of the first frequency and cells are prioritized according to highest measurements of signal strength and/or quality after the step of reducing signal values.

The cell selection process may further comprise the step of changing to a different radio access technology.

The cell selection process further comprises the step of changing to a different radio access technology.

Referring back to FIG. 5, in order to perform the method a user equipment 600 is provided comprising a receiving unit 606 arranged to receive, when the user equipment 600 is in idle mode, data from a base station indicating an identification of a second cell of a second frequency. The user equipment comprises a control unit 610 arranged to determine, based on the received data, that the user equipment 600 is not allowed access to the second cell. Upon determination that the user equipment is not allowed access to the second cell, the control unit 610 is arranged to perform a cell selection process to change from a present camped first cell of a first frequency to a third cell of a third frequency being different than the first frequency.

The user equipment may comprise a memory 612 with a stored list of cells identifications thereon indicating allowed access and wherein the control unit is arranged to compare the received data with cell identifications in the list to determine that the user equipment is not allowed access to the second cell.

The list may comprise a white list containing identification of cells that the user equipment is allowed to access and/or the list may comprise a black list containing identification of cells that the user equipment is denied to access.

The control unit 610 may further be arranged to determine whether to perform a cell selection procedure taking into account that the user equipment is too close to a forbidden cell.

Furthermore, the control unit 610 may be arranged to measure a signal strength/quality carrying the received data and based on the received data and the measured signal strength/quality to determine to perform a cell selection process to change to the third cell.

In addition, the control unit 610 may be arranged to reduce signal strength and/or quality measurements by a predetermined value of cells of the first frequency and cells are prioritized in the cell selection process according to highest signal strength and/or quality measurements.

The user equipment may furthermore comprise a transmitting arrangement 608 and the control unit 610 may be arranged to transmit data relating to a selected cell to connect to the selected cell.

The control unit may also be arranged to change radio access technology of a different frequency band.

The user equipment may be a mobile device, such as a mobile phone, PDA, or the like, wherein the user equipment may further comprise a keypad 601, a microphone 602, a display 603 and/or a speaker 604.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a user equipment camped on a first cell that uses a first frequency, the method comprising:

receiving, from a base station, data identifying a second cell using a second frequency, wherein the second frequency is the same frequency as the first frequency, determining that the user equipment is not allowed to access the second cell;

performing, upon determination that the user equipment is not allowed to access the second cell, a cell selection process to find a third cell to access, using a third frequency that differs from the first frequency, to avoid interference between the user equipment and the second cell.

2. The method of claim 1, wherein determining that the user equipment is not allowed to access the second cell comprises determining that the second cell is on a list of cells forbidden to access.

3. The method of claim 1, wherein determining that the user equipment is not allowed to access the second cell comprises determining that the second cell is omitted from a list of cells permitted to access.

4. The method of claim 1, wherein performing a cell selection process comprises taking into account that the user equipment is too close to a forbidden cell.

5. The method of claim 4, wherein the cell selection process is based on a predetermined threshold value of signal measurement for the second cell, wherein the predetermined threshold value must be exceeded to initiate the cell selection.

6. The method of claim 5, wherein the cell selection process comprises reducing, by a predetermined value, signal strength measurements, quality measurements or both, for cells of the first frequency, and wherein the cell selection process prioritizes cells of highest measurements of signal strength, quality, or both, after measurements are reduced.

7. The method of 1, wherein the cell selection process comprises changing to a different radio access technology.

8. The method of 1, further comprising:

receiving a rejection message when the user equipment is in active mode, the rejection message indicating that the user equipment is not allowed to access the second cell; and updating a list of cells indicating accessibility with an identification of the second cell.

9. A user equipment comprising:

a receiving unit arranged to receive, when the user equipment is in idle mode, data from a base station identifying a second cell using a second frequency;

a control unit arranged to determine, based on the received data, that the user equipment is not allowed access to the second cell, and, upon determination that the user equipment is not allowed access to the second cell, to perform a cell selection process to change from a present camped first cell of a first frequency to a third cell, the third cell using a third frequency that differs from the first frequency.

10. The user equipment of claim 9, further comprising a memory with a stored list of cells identifications thereon indicating allowed access, and wherein the control unit is arranged to compare the received data with cell identifications in the list to determine that the user equipment is not allowed access to the second cell.

11. The user equipment of claim 10, wherein the list comprises a white list containing identification of cells that the user equipment is allowed to access.

12. The user equipment of claim 10, wherein the list comprises a black list containing identification of cells that the user equipment is denied to access.

13. The user equipment of claim 9, wherein the control unit is further arranged to determine whether to perform a cell selection procedure by taking into account whether the user equipment is too close to a forbidden cell.

14. The user equipment of claim 9, wherein the control unit is arranged to measure a signal strength or a signal quality, or both, for a signal carrying the received data, and, based on the received data and the measured signal strength or measured signal quality, or both, to determine to perform a cell selection process to change to the third cell.

15. The user equipment of claim 14, wherein the control unit is arranged to reduce, by a predetermined value, signal strength or quality measurements, or both, for cells of the first frequency, and wherein the cell selection process prioritizes cells having highest signal strength or signal quality measurements, or both.

16. The user equipment of claim 9, further comprising a transmitting arrangement, wherein the control unit is arranged to transmit data relating to a selected cell to connect to the selected cell.

17. The user equipment of claim 9, wherein the control unit is arranged to perform the cell selection process to change from a present camped first cell of a first frequency using a first radio access technology to a third cell, using a third frequency that differs from the first frequency and using a different radio access technology.

* * * * *